United States Patent

Teti

(10) Patent No.: US 7,432,477 B2
(45) Date of Patent: Oct. 7, 2008

(54) SET-BACK CONTROL FOR BOTH HVAC AND WATER HEATER VIA A SINGLE PROGRAMMABLE THERMOSTAT

(76) Inventor: Robert Teti, 21 Waterside Crs., Maple, Ontario (CA) L6A 3X6

( * ) Notice: Subject to any disclaimer, the term of this patent is extended or adjusted under 35 U.S.C. 154(b) by 289 days.

(21) Appl. No.: 11/406,501

(22) Filed: Apr. 19, 2006

(65) Prior Publication Data

US 2006/0243816 A1    Nov. 2, 2006

Related U.S. Application Data

(60) Provisional application No. 60/672,508, filed on Apr. 19, 2005.

(51) Int. Cl.
*H05B 1/02* (2006.01)

(52) U.S. Cl. .............. 219/492; 219/519; 219/491; 236/91 B; 236/DIG. 9

(58) Field of Classification Search ............ 219/491, 219/492, 494, 497, 501, 508, 511, 518, 519; 236/91 R, 91 B, 91 E, DIG. 8, DIG. 9; 307/38–41
See application file for complete search history.

(56) References Cited

U.S. PATENT DOCUMENTS

| | | | |
|---|---|---|---|
| 4,078,720 A | 3/1978 | Nurnberg | |
| 4,298,946 A | 11/1981 | Hartsell et al. | |
| 4,370,723 A | 1/1983 | Huffman et al. | |
| 4,382,544 A * | 5/1983 | Stewart | 236/46 R |
| 4,386,649 A | 6/1983 | Hines et al. | |
| 4,433,718 A | 2/1984 | Bresin | |
| 4,508,261 A | 4/1985 | Blank | |
| 4,549,160 A | 10/1985 | McGhee | |
| 4,700,886 A | 10/1987 | McGhee et al. | |
| 4,751,961 A * | 6/1988 | Levine et al. | 165/238 |
| 4,799,176 A | 1/1989 | Cacciatore | |
| 4,834,284 A | 5/1989 | Vandermeyden | |
| 4,872,828 A | 10/1989 | Mierzwinski et al. | |
| 4,938,172 A | 7/1990 | Belovarac | |
| 5,023,432 A | 6/1991 | Boykin et al. | |
| 5,056,712 A | 10/1991 | Enck | |
| 5,181,653 A | 1/1993 | Foster et al. | |
| 5,219,119 A | 6/1993 | Kasper et al. | |
| 5,289,362 A | 2/1994 | Liebl et al. | |
| 5,314,004 A | 5/1994 | Strand et al. | |
| 5,361,982 A | 11/1994 | Liebl et al. | |
| 5,634,590 A | 6/1997 | Gorski et al. | |
| 5,635,896 A | 6/1997 | Tinsley | |

(Continued)

FOREIGN PATENT DOCUMENTS

CA        595993        4/1960

(Continued)

*Primary Examiner*—Mark H Paschall
(74) *Attorney, Agent, or Firm*—Katten Muchin Rosenman LLP

(57) ABSTRACT

A system and method of using a set-back or programmable thermostat for heating or cooling systems to also controlling a fast-recovery water heater such as a power-vented fossil fuel powered water heater such that the water heater is disabled during a set-back mode of the thermostat. The system sends a control signal to a relay module adjacent to the water heater, into which the water heater electrical power cord can be plugged into. The interlock mechanism of the water heater prevents operation of the water heater when power to the water heater is interrupted.

1 Claim, 2 Drawing Sheets

U.S. PATENT DOCUMENTS

| | | |
|---|---|---|
| 5,822,997 A | 10/1998 | Atterbury |
| 5,968,393 A | 10/1999 | Demaline |
| 6,032,616 A | 3/2000 | Jones |
| 6,129,284 A | 10/2000 | Adams et al. |
| 6,293,471 B1 | 9/2001 | Stettin et al. |
| 6,336,593 B1 | 1/2002 | Bhatnagar |
| 6,741,915 B2 | 5/2004 | Poth |
| 6,785,630 B2 | 8/2004 | Kolk et al. |
| 6,934,862 B2 * | 8/2005 | Sharood et al. ............ 713/300 |
| 6,955,301 B2 | 10/2005 | Munsterhuis et al. |
| 7,032,543 B1 * | 4/2006 | Akkala et al. ............ 122/14.31 |
| 2005/0150967 A1 | 7/2005 | Chapman, Jr. et al. |
| 2006/0025891 A1 * | 2/2006 | Budike, Jr. ................. 700/275 |
| 2006/0027669 A1 | 2/2006 | Proffitt et al. |
| 2006/0208099 A1 * | 9/2006 | Chapman et al. .............. 236/51 |
| 2008/0011864 A1 * | 1/2008 | Tessier et al. ................. 236/51 |

FOREIGN PATENT DOCUMENTS

| | | |
|---|---|---|
| CA | 2058833 | 7/1993 |
| CA | 2130039 | 3/1995 |
| CA | 2102372 | 8/1998 |
| CA | 2125014 | 11/1998 |
| CA | 2324669 | 4/2002 |
| CA | 2158120 | 4/2006 |
| WO | 94/10620 A1 | 5/1994 |
| WO | WO 96/27769 | 9/1996 |
| WO | WO 2005/071510 | 8/2005 |

* cited by examiner

SET-BACK CONTROL FOR BOTH HVAC AND WATER HEATER VIA A SINGLE PROGRAMMABLE THERMOSTAT

CROSS-REFERENCE TO RELATED APPLICATIONS

The entire subject matter of U.S. Provisional application Ser. No. 60/672,508 filed Apr. 19, 2005 and entitled WATER HEATER CONTROL is hereby incorporated by reference. The applicant claims priority benefit under Title 35, United States Code, Section 119(e) of U.S. Provisional application Ser. No. 60/672,508 filed Apr. 19, 2005 and entitled WATER HEATER CONTROL.

MICROFICHE APPENDIX

Not Applicable.

TECHNICAL FIELD

The present invention relates to thermostats and water heater controllers and more specifically to programmable thermostats and controllers for water heaters.

BACKGROUND OF THE INVENTION

Programmable thermostats for furnaces, boilers, heat-pumps, air-conditioning systems or combinations thereof are well known in the art, to reduce heating or cooling demand to buildings during times when they are unoccupied or when inhabitants thereof are in bed and thus can remain comfortable with a lower ambient temperature. This can result in considerable energy savings with little effect on the comfort of users. Such programmable thermostats typically permit programming different desired temperatures for selectable time periods.

Similarly, water heaters can benefit from programmable control. There are programmable thermostats for electric water heaters known in the art. Systems incorporating a programmable thermostat with an electric water heater have the disadvantage of adding complexity to water heater products and require increased inventory for sellers. As well, because electric water heaters have a fairly long recovery time, for such thermostatically controlled systems to function well, they require thermostats with additional learning features to monitor the recovery time and activate the water heater in advance of the programmed time. Programming a water heater thermostat independently of a furnace or air conditioner thermostat imposes extra effort on users.

It is an object of the present invention to provide an easy-to-use programmable thermostat adapted to control a heating and/or cooling system, including a furnace, boiler, heatpump, air-conditioning system or any combination thereof in conjunction with a fossil-fueled water heater such as natural gas or propane powered water heater.

SUMMARY OF THE INVENTION

According to one aspect of the invention, an apparatus is provided to control a power conserving mode in a fossil fuel powered water heater in conjunction with a heating and/or cooling system, including a furnace, boiler, heatpump, air-conditioning system or any combination thereof.

According to another aspect of the invention, a method is provided to disable a fossil fuel powered water heater during set-back periods of a programmable thermostat.

Optionally and preferably, the water heater is a power vented fossil fuel powered water heater, which is disabled by disengaging a relay contact providing electric power to a vent fan of the water heater.

According to one aspect of the invention, an apparatus is provided for controlling a power-conserving mode in a heating and/or cooling system in conjunction with a fossil fuel powered water heater, said fossil fuel powered water heater requiring electric power for control and/or venting. The apparatus comprises a thermostat means for controlling said furnace and/or air conditioner; and a relay means for controlling electric power to said water heater. The thermostat means is operable to provide a set-back mode for reducing energy consumption, and the thermostat means is configured to control the relay means to disconnect electric power to the water heater during the set-back mode.

In some embodiments, the thermostat is a set-back thermostat.

In some embodiments, the thermostat is a programmable thermostat.

In some embodiments, the fossil fuel powered water heater comprises a ventilation fan, a fossil fuel powered heating means and an interlock means operable to disable the heating means when the ventilation fan is inactive.

In some embodiments, the relay means is configured to disconnect electric power to said ventilation fan.

In some embodiments, the relay means is located proximate said water heater.

In some embodiments, the relay means controls an electrical outlet operable to supply the water heater.

In some embodiments, the relay means further comprises: an electrical relay having a power input, a power output and a control input; an enclosure for enclosing said relay; a plug means affixed to said enclosure for plugging into an electrical outlet, said plug means in electrical communication with said relay power input; a socket means affixed to said enclosure for accepting a plug of a power cord to said water heater, said socket means in electrical communication with said relay power output; and electrical terminals to accept control wires from said thermostat, said electrical terminals in electrical communication with said relay control input.

In some embodiments, the relay control input is operable to accept circuit completion at said thermostat as control signal.

In some embodiments, the relay control input is operable to accept an electrical voltage signal as control signal.

In some embodiments, the electrical voltage signal is an ac or dc voltage in the range of 5 to 30 volts.

In some embodiments, the apparatus is a stand-alone device, independent of inputs from external devices.

In some embodiments, the apparatus is a residential HVAC thermostat.

In some embodiments, the water heater comprises a hot water storage reservoir.

In some embodiments, the relay means is incorporated into said water heater.

Another aspect of the present invention provides a method of disabling a power-vented fossil fuel powered water heater during set-back periods of a programmable thermostat. The method comprises steps of: programming a set-back mode for a predetermined time period on said programmable thermostat; activating said set-back mode at the start of said set-back time period; sending a control signal to a relay means; disengaging a relay contact at said relay means so as to interrupt electric power to said water heater.

In some embodiments, the step of interrupting electric power to the water heater, interrupts power to a vent fan of the water heater and an interlock means of the water heater disables the heating means of the water heater.

In some embodiments, the power-vented fossil fuel powered water heater comprises a ventilation fan, a fossil fuel powered heating means and an interlock means operable to disable the heating means when the ventilation fan is inactive, and wherein the step of interrupting electric power to the water heater comprises a step of interrupting electric power to the ventilation fan. The method further comprises a step of the interlock means disabling the heating means, responsive to the interruption of power to the ventilation fan.

Yet another aspect of the present invention provides a kit for retrofitting set-back functionality to a power-vented fossil fuel powered water heater. The kit comprises a thermostat means for controlling a furnace and/or air conditioner; and a relay means for controlling electric power to said water heater. The thermostat means is operable to provide a set-back mode for reducing energy consumption, and the thermostat means controls the relay means to disconnect power to the water heater during the set-back mode.

In some embodiments, the power-vented fossil fuel powered water heater comprises a ventilation fan, a fossil fuel powered heating means and an interlock means operable to disable the heating means when the ventilation fan is inactive and wherein the relay means is configured to interrupt electric power to the ventilation fan.

BRIEF DESCRIPTION OF THE DRAWINGS

Several preferred embodiments of the present invention will now be described, by way of example only, with reference to the appended drawings in which.

It will be noted that, throughout the appended drawings, like features are identified by like reference numerals.

DETAILED DESCRIPTION OF THE PREFERRED EMBODIMENT

The present invention provides a system for controlling a power-saving mode of a fossil fuel powered water heater in conjunction with a furnace or air conditioner.

Figure 1:
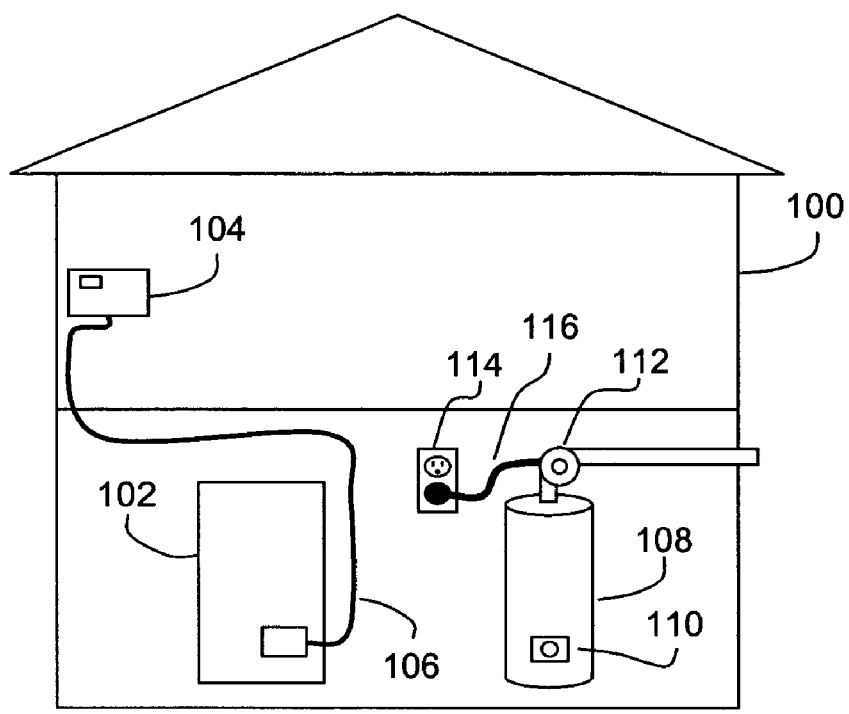
FIG. 1 is a schematic illustration of a prior art furnace and water heater arrangement.

FIG. 1 illustrates a typical prior art arrangement of a furnace 102 and a power-vented, fossil fuel powered water heater 108 in a residential dwelling 100. Note that furnace 102 could be another heating and/or cooling system, including a boiler, heatpump, air-conditioning system or any combination thereof, for the purposes of this invention. Note also that the dwelling 100, could be any building or structure requiring heating or cooling and hot water. The furnace 102 is controlled by a programmable thermostat 104, which connected to the furnace 102 by control wires 106. Programmable thermostat 104 can be programmed for different air temperatures during the day. There is notably a set-back mode wherein the thermostat 104 is set to a lower temperature than is typically comfortable for inhabitants of the dwelling 100. The set-back mode is used for when the dwelling 100 is unoccupied, such as when the inhabitants are at work. A set-back mode can also be used when the inhabitants are in bed and have the benefit of blankets, and thus can be comfortable in a lower ambient temperature.

The power-vented fossil fuel powered water heater 108 is controlled by an integral thermostat 110 which regulates the temperature of the water in the water heater. Such water heaters are typically powered by natural gas or propane. Combustion gases are vented from the heater by blower 112 which powered by standard electrical outlet 114 via power cable 116. The blower 112 is typically controlled by integral thermostat 110. As well, the integral thermostat 110 has an interlock to prevent operation of the water heater 108 if the blower 112 is not functioning. The water heater 108 and the electrical outlet 114 for the water heater are typically installed in proximity to furnace 102. In a typical prior art arrangement, the water heater 108 maintains a specified water temperature continuously throughout the day, irrespective of hot water usage patterns throughout the day.

Figure 2:
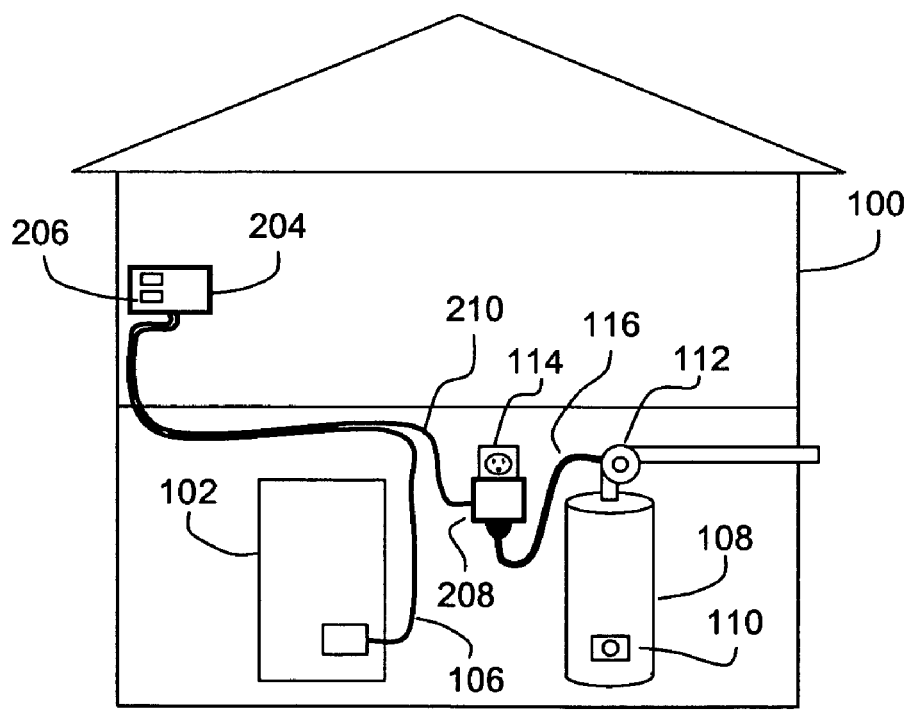
FIG. 2 is a schematic illustration of an exemplary embodiment of the present invention having a single programmable thermostat controlling set-back of a furnace and water heater.

FIG. 2 illustrates an embodiment of the present invention as installed in an arrangement similar to that of dwelling 100 in FIG. 1. In the embodiment of FIG. 2, a programmable thermostat 204 controls set-back modes for both the furnace 102 and water heater 108. Thermostat 204 has a control button 206 to enable control of the set-back mode of water heater 108. When the water heater control is enabled via button 206, then whenever programmable thermostat 204 is in a set-back mode, it controls relay 208 via control wires 210, to disable power to the water heater 108. Relay 208 is preferably a module which plugs into a standard electrical outlet 114 and has single outlet into which the power cord 116 of the water heater 108 can be plugged. The relay module 208 has terminals for connecting control wires 210 from the programmable thermostat 204. In a preferred embodiment, the relay module 208 is activated by application of a control signal, such as for example, a typical 24 volt ac signal used to control fan and furnace relays. A contact closure or other circuit completion means within the thermostat 204 controls the application of a 24 Volt ac signal from an external transformer, as is well known in the art. Thermostats typically use an external 24 V ac transformer to supply power for the control signals to relays to activate furnaces, furnace fans, and air conditioners. Such a transformer can also supply the power to activate the relay module 208. A commercially available relay suitable for switching the load of a forced ventilation blower 112 can be used in relay module 208.

In another embodiment, the relay module has an integral power source such as a 24 Volt ac transformer and requires only circuit completion means to activate, such that the relay module can be connected directly to the thermostat 204. This embodiment has the advantage of simpler installation, but would require more parts.

In a preferred embodiment, the relay 208 maintains power to the water heater 108 by default (normally closed contacts).

In an alternate embodiment, the relay 208 can be permanently wired into the electrical box of outlet 114.

In applications where the water heater 108 is installed in a location remote from the furnace 102, and running control wires 210 is more difficult, a remote control module such as the type compatible with X10 power line signals (www.X10.com) can be used.

FIG. 2 illustrates power cord 116 connected to blower 112. In such a case, when relay 208 disables power to power cord 116, and thus to the blower 112, the interlock of integral thermostat 110 will disable the water heater 108. Some power-vented fossil-fuel-powered water heaters have power cord 116 connected directly to the integral thermostat 110, in which case disabling power to power cord 116 will directly turn off water heater 108.

Power-vented fossil fuel powered water heater 108 has a fast recovery time and thus when programmable thermostat 204 moves from set-back mode to a regular mode, water in the water heater 108 will reach the desired temperature sufficiently quickly so as to be usable by inhabitants of the dwelling.

The present invention provides advantages of reducing fuel consumption of the power-vented fossil fuel powered water heater 108 by turning off the water heater during times when the programmable thermostat is in set-back mode. There is no extra effort required by the user who would ordinarily use a programmable thermostat for his/her furnace, because the programmed set-back mode schedule for the furnace 102 is also used by the water heater 108. When the present invention is used with a power-vented fossil fuel-powered water heater 108, which typically has a fast recovery time, the user will have hot water available during the same periods as when the air temperature is set to a comfortable level. The control button 206 permits the user to easily override the set-back mode of the water heater 108 in situations when hot water is required during period when the furnace is in set-back mode. The water heater 108 will then maintain the desired water temperature continuously as is the typical case in the prior art.

Control wire 106 is typically a multi-conductor cable. A typical furnace installation typically does not require all of the conductors within control wire 106. As long as there are two spare conductors, the present invention can use those spare conductors for use as control wires 210. It is a simple matter to extend the extra conductors from the furnace 102 to the relay module 208. In new-home construction, it is common practice to pre-install control wires 210 between the intended location for thermostat 104 and the intended location for the furnace 102. To facilitate the use of the present invention in new-home construction, it would be useful to ensure that spare conductors exist in control wires 106, especially in situations where more sophisticated heating systems are being installed.

Figure 3:
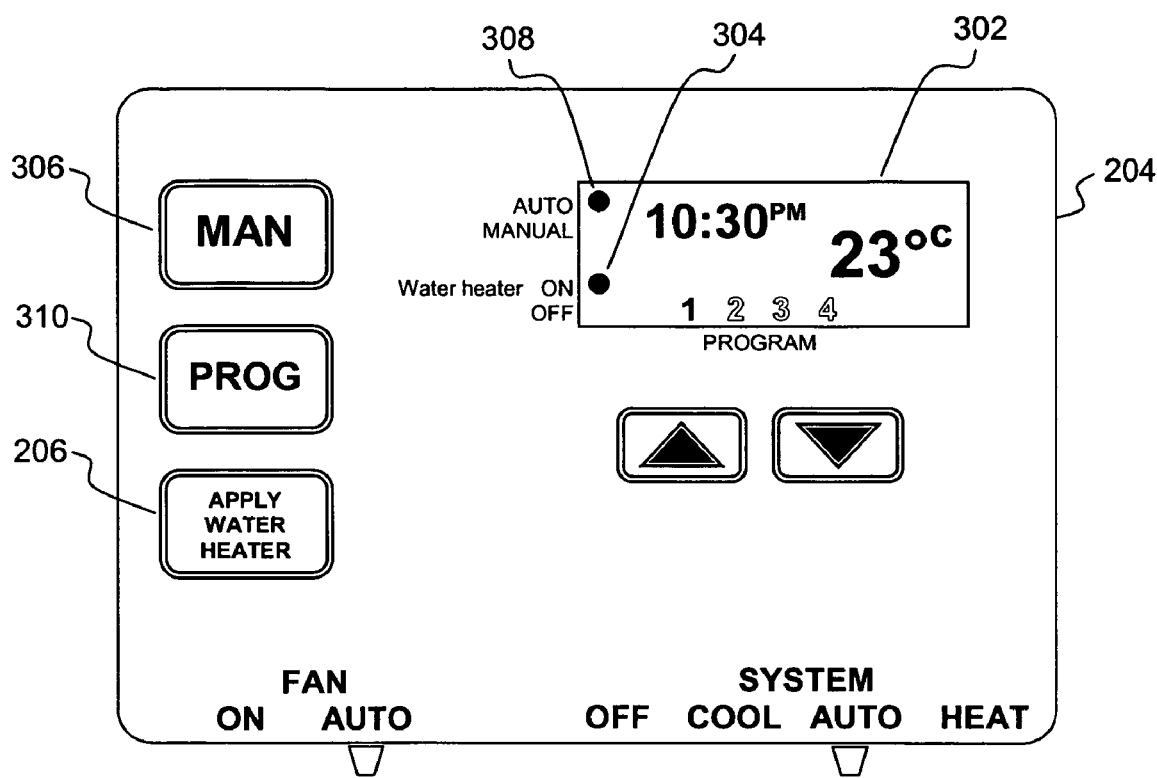
FIG. 3 is a schematic illustration of an exemplary programmable thermostat of the present invention.

FIG. 3 illustrates an exemplary embodiment of the thermostat 204 of the present invention. It is of the type known as programmable thermostat or set-back thermostat. Such thermostats are typically digitally controlled, although this is not necessary for the purposes of the present invention. Display 302 indicates the current temperature, time and status. The display 302 illustrates exemplary program modes "1", "2", "3"and "4", wherein program mode "1"is currently active. The water heater status indicator 304 indicates whether the thermostat is controlling the set-back operation of the water heater or if the water heater is operating in a normal always-on mode. Water heater control button 206 enables or disables the set-back control of the water heater. In one embodiment, pressing the water heater control button 206 will toggle the set-back control between disable and enable.

When the thermostat 204 is in program mode. The water heater control button 206 can be used to select which of the program modes will "set back" or disable the water heater. Various combinations of programs can be selected for set-back mode such as for example: "1", "2", "3", "4", "2 & 3", "2 & 3 & 4", "3 &4", etc.

In another embodiment, the program modes are labeled as "Leave", "Return" and "Sleep", wherein the "Return" mode is used when inhabitants of a dwelling are present and comfortable ambient temperatures are desired. The "Leave" mode is used when the inhabitants are not home, typically, when they are at work. The "Sleep" mode is used when the inhabitants are in bed and thus have the benefit of extra blankets. In a typical scenario, the "Leave" and "Sleep" modes are used as set-back modes, in which case the water heater control button 206 can select "Leave" or "Sleep" or both, as set-back modes to apply to the control of the water heater 108.

The thermostat 204 has an output terminals for the control wires 210. In one embodiment, there are two terminals provided, one for the control signal to relay module 208 and the other for the return connection to a 24 volt ac transformer, as is well known in the art. In some installations where the fan, furnace, air conditioner and water heater control can share a 24 volt ac transformer and the return connections for each of these can be jumpered together.

Thus the thermostat 204 is used to turn off or disable a fossil-fueled water heater during periods when there is little or no anticipated demand for hot water. These periods usually coincide with "set-back" periods of a programmable thermostat.

In preferred embodiments, the thermostat 204 present invention works with heating systems and cooling systems as well as combination heating and cooling sytems including dual-stage systems such as those having a heat-pump and a back-up electric heat system.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

I claim:

1. A method of disabling a power-vented fossil fuel powered water heater during set-back periods of a programmable thermostat, said method comprising steps of:

programming a set-back mode for a predetermined time period on said programmable thermostat;

activating said set-back mode at the start of said set-back time period;

sending a control signal to a relay means;

disengaging a relay contact at said relay means so as to interrupt electric power to said water heater;

wherein said power-vented fossil fuel powered water heater comprises a ventilation fan, a fossil fuel powered heating means and an interlock means operable to disable said heating means when said ventilation fan is inactive, and wherein said step of disengaging a relay contact comprises a step of interrupting electric power to said ventilation fan, said method further comprising a step of said interlock means disabling said heating means, responsive to said step of interrupting power to said ventilation fan.

* * * * *